(12) United States Patent
Kaizu et al.

(10) Patent No.: US 12,553,863 B2
(45) Date of Patent: Feb. 17, 2026

(54) ELECTRONIC DEVICE AND POWER MODULE

(71) Applicant: DENSO CORPORATION, Kariya (JP)

(72) Inventors: Ryoichi Kaizu, Kariya (JP); Yuki Inaba, Kariya (JP); Tomomi Okumura, Kariya (JP); Toshifumi Hosono, Kariya (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 18/470,608

(22) Filed: Sep. 20, 2023

(65) Prior Publication Data

US 2024/0003851 A1  Jan. 4, 2024

Related U.S. Application Data

(63) Continuation of application No. PCT/JP2022/012373, filed on Mar. 17, 2022.

(30) Foreign Application Priority Data

Mar. 29, 2021  (JP) .................................. 2021-055566

(51) Int. Cl.
| | |
|---|---|
| *G01N 29/32* | (2006.01) |
| *B06B 1/02* | (2006.01) |
| *G01N 29/06* | (2006.01) |
| *G01N 29/34* | (2006.01) |
| *G01N 29/36* | (2006.01) |

(52) U.S. Cl.
CPC ....... *G01N 29/0672* (2013.01); *B06B 1/0215* (2013.01); *G01N 29/343* (2013.01); *G01N 2291/0231* (2013.01)

(58) Field of Classification Search
CPC ............... G01N 29/341; G01N 29/343; G01N 29/0654; G01N 29/0663; G01N 29/0672; G01N 29/0681; G01N 29/069; H01L 23/485; B32B 27/08; B32B 15/08; B32B 15/082; B32B 15/085; B32B 15/088; B32B 15/09; B32B 15/092; B32B 15/095; B32B 15/098
See application file for complete search history.

(56) References Cited

U.S. PATENT DOCUMENTS

2020/0075529 A1* 3/2020 Otsuka .................... H01L 24/84
2021/0398881 A1* 12/2021 Hatano ............ H01L 23/49575

FOREIGN PATENT DOCUMENTS

JP  2012211826 A  * 11/2012

* cited by examiner

*Primary Examiner* — Herbert K Roberts
(74) *Attorney, Agent, or Firm* — Posz Law Group, PLC

(57) ABSTRACT

A power module comprises an element and an insulated circuit board having a laminated portion. The laminated portion includes a first metal layer, a bonding layer interposed between an element and the first metal layer, a second metal layer, and a resin layer interposed between the first metal layer and the second metal layer. The insulated circuit board has a pair of laminated portions provided so as to sandwich the element. The laminated portions are configured so that ultrasonic pulses emitted from an outside of the second metal layer toward the element have the following relationship of detection time periods. A time period in which the ultrasonic pulse travels two roundtrips in the second metal layer is longer than a time period in which the ultrasonic pulse travels one roundtrip in a range from the second metal layer to the element.

10 Claims, 13 Drawing Sheets

ELECTRONIC DEVICE AND POWER MODULE

CROSS REFERENCE TO RELATED APPLICATIONS

The present application is a continuation application of International Patent Application No. PCT/JP2022/012373 filed on Mar. 17, 2022, which designated the U.S. and is based on and claims the benefit of priority from Japanese Patent Application No. 2021-55566 filed on Mar. 29, 2021, and all the contents of the application are incorporated by reference.

TECHNICAL FIELD

The disclosure herein relates to an electronic device and a power module.

BACKGROUND

An apparatus of Scanning Acoustic Tomography is used to detect flaw inside an object using an image of reflection of ultrasonic waves emitted toward the object to be inspected. In the case that the object has a plurality of layers, the ultrasonic waves may reflect each boundary of the layers and this reflection at the boundary may deteriorate an ability of inspecting the object. In the above aspects, or in other aspects not mentioned, there is a need for further improvements in Scanning Acoustic Tomography.

SUMMARY

One of disclosed electronic device comprises an element, and a laminated portion which is formed to include a first conductor layer formed to include a conductor, a bonding layer interposed between the element and the first conductor layer to conduct electricity, and a second conductor layer formed to include a conductor, and a resin layer formed to include a resin and interposed between the first conductor layer and the second conductor layer, wherein the laminated portion is configured so that a time period in which an ultrasonic pulse emitted from outside the second conductor layer toward the element travels two roundtrips in the second conductor layer is longer than a time period in which the ultrasonic pulse travels one roundtrip in a range from the second conductor layer to the element.

One of disclosed electronic device comprises an element, and a laminated portion which is formed to include a first conductor layer formed to include a conductor, a bonding layer interposed between the element and the first conductor layer to conduct electricity, and a second conductor layer formed to include a conductor, and a resin layer formed to include a resin and interposed between the first conductor layer and the second conductor layer, wherein the laminated portion is configured so that a time period in which an ultrasonic pulse emitted from outside the second conductor layer toward the element travels three roundtrips in the second conductor layer is longer than a time period in which the ultrasonic pulse travels one roundtrip in a range from the second conductor layer to the element, and a time period in which the ultrasonic pulse travels one roundtrip through the second conductor layer, the resin layer, and the first conductor layer is longer than a time period in which the ultrasonic pulse travels two roundtrips through the second conductor layer.

According to this disclosure, in an image of Scanning Acoustic Tomography for a laminated portion having a resin layer, it is possible to suppress multiple reflected waves from entering into an inspection gate, and improve an inspectability of an image of Scanning Acoustic Tomography. Regarding a laminated portion that satisfy such ultrasonic pulse detection conditions, improvement of an inspectability of an image of SAT has been confirmed using an image of SAT for the laminated portions having various configurations such as materials and thicknesses. Therefore, it is possible to provide an electronic device capable of obtaining a good inspectability of an image of SAT through the resin layer.

DETAILED DESCRIPTION

Figure 1:
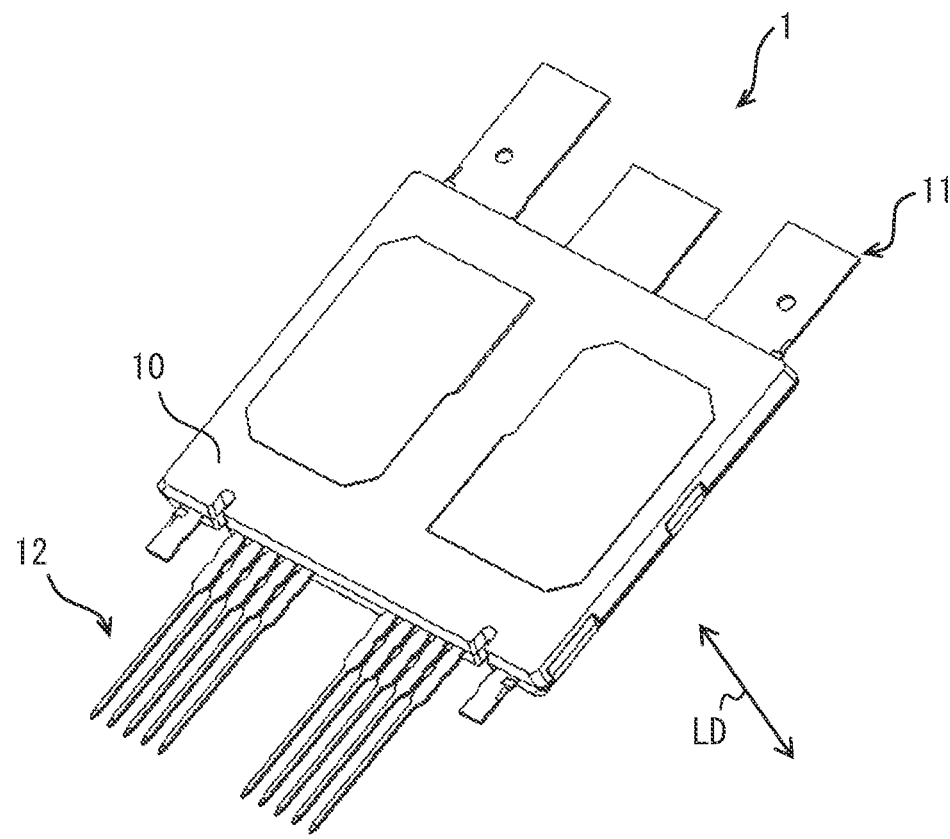
FIG. 1 is an external view of a power module as an example of an electronic device.

JP2012-211826A discloses an apparatus of Scanning Acoustic Tomography which detects flaws inside an object using an image obtained by using reflection of an ultrasonic wave emitted toward the object to be inspected.

In a case that the apparatus of Scanning Acoustic Tomography emits ultrasonic waves through a resin layer to an object to be inspected such as an electronic device, multiple reflections of an ultrasonic wave tend to occur inside a conductor layer in contact with the resin. In this case, an inspectability of an image of Scanning Acoustic Tomography tends to deteriorate due to multiple reflected waves entering an inspection gate. There are demands to improve an inspectability of an image of Scanning Acoustic Tomography (also referred to as SAT inspectability) for electronic devices.

It is one of objects of this disclosure in this specification to provide an electronic device and a power module capable of obtaining fine SAT inspectability through a resin layer.

Hereinafter, embodiments for implementing the present disclosure is described referring to drawings. In each embodiment, the same reference numerals may be given to parts corresponding to matters described in a preceding embodiment, and overlapping explanations may be omitted. When only a part of a configuration is described in an embodiment, the other preceding embodiments can be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

A first embodiment is described with reference to FIGS. 1 to 22. An electronic device is a device including an element such as a semiconductor and an insulated circuit board. This electronic device may be applied to, for example, a power module including a switching element. This electronic device may be applied to an in-vehicle power control device mounted in a vehicle such as an electric vehicle, a fuel cell vehicle and the like. The vehicle may include a passenger car, a bus, a construction work vehicle, an agricultural machinery vehicle, and the like. The power control device capable of achieving the object specified in the specification may be applied to, for example, an inverter device, a converter device, or the like. The converter device may be, for example, one of a power supply device having an AC input and a DC output, a power supply device having a DC input and a DC output, and a power supply device having an AC input and an AC output.

Figure 2:
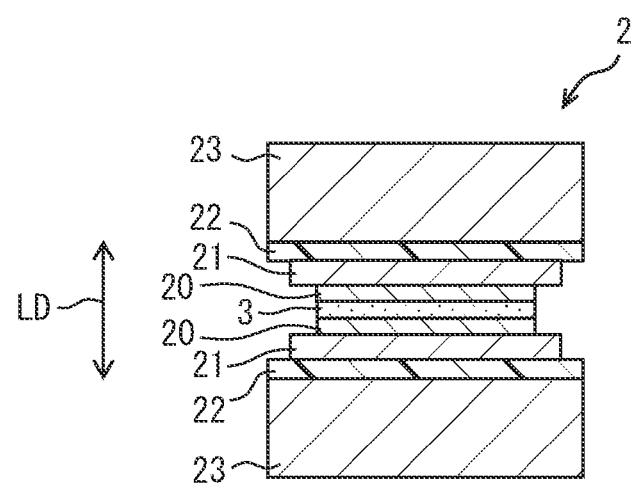
FIG. 2 is a cross-sectional view showing a stack including an insulated circuit board.

The power module 1, which is an example of an electronic device capable of achieving the object disclosed in the specification, is described below with reference to FIG. 1 and FIG. 2. The power module 1 includes an insulated circuit board 2, a sealing resin portion 10, a semiconductor chip, main terminals 11 and signal terminals 12. The power module 1 may be configured to include a conductive member which connects the insulated circuit board 2 and the main terminals 11. The conductive member functions as wiring for the main electrodes. The conductive member is connected between the drain electrode and the main terminal 11, and between the source electrode and the main terminal 11. The conductive member may also function to dissipate heat of the element 3 to an outside of the power module 1. The conductive member may be formed to include a metal material such as Cu in order to ensure electrical conductivity and thermal conductivity.

The sealing resin portion 10 incorporates the insulated circuit board 2 and the semiconductor chip, supports the main terminals 11 and the signal terminals 12, and insulates them. The sealing resin portion 10 is made of an insulating resin material, for example, an epoxy resin. The sealing resin portion 10 has a flat rectangular parallelepiped shape. The sealing resin portion 10 may have a structure sealed with gel.

The semiconductor chip includes an element 3 formed on a semiconductor substrate of Si, SiC, GaN, or the like. Switching elements which are elements 3 configuring one arm and diodes are formed on the semiconductor chip. In other words, an RC, i.e., Reverse Conducting-IGBTs are formed on the semiconductor chip as an element 3. The element 3 has a gate electrode. The semiconductor chip has main electrodes on both sides. The semiconductor chip has a drain electrode as a main electrode on one side, and a source electrode as a main electrode on the back side opposite to the one side. The drain electrode also serves as a cathode electrode of the diode, and the source electrode also serves as an anode electrode of the diode.

The insulated circuit board 2 provides a laminated portion including a plurality of layers. A plurality of layers are formed by laminating a first metal layer 21 as a first conductor layer, a resin layer 22 having an insulating property, a second metal layer 23 as a second conductor layer, and a bonding layer 20. The insulated circuit board 2 includes a pair of laminated portions provided on both sides of the element 3 so as to sandwich the element 3 therebetween. The insulated circuit board 2 has a pair of laminated portions symmetrical with respect to the element 3. The insulated circuit board 2 enables double-sided heat dissipation in which the heat generated by the element 3 is radiated from the pair of second metal layers 23 located outside of both surfaces of the element 3.

The first metal layer 21 is an example of a conductor layer formed mainly including a conductor. The conductor includes metal, graphite, etc. The second metal layer 23 is an example of a conductor layer formed mainly including a conductor layer. The resin layer 22 is sandwiched between the first metal layer 21 and the second metal layer 23 on both sides. The resin layer 22 is formed to include a predetermined resin, and insulates the first metal layer 21 and the second metal layer 23 from each other.

The first metal layer 21 is electrically coupled to the element 3 via the bonding layer 20 and forms a mounting surface of the element 3. The bonding layer 20 is a layer interposed between the first metal layer 21 and the element 3, and electrically couples the first metal layer 21 and the element 3. The bonding layer 20 is made of, for example, solder or sintered silver.

The second metal layer 23 is provided at a position farther from the element 3 than the resin layer 22 and the first metal layer 21, and forms a heat radiation surface that easily radiates heat from the element 3 to the outside. The power module 1 includes an element 3 and a laminated portion in which a bonding layer 20, a first metal layer 21, a resin layer 22, and a second metal layer 23 are laminated in a thickness direction in an order close to the element 3. The thickness direction of each layer corresponds to the lamination direction (LD) in the laminated portion.

The resin layer 22 may include an organic substance and an inorganic substance. The organic substance is, for example, an epoxy resin. The inorganic substance include fillers such as glass and ceramics.

The resin layer 22 is preferably configured to have an acoustic impedance of 10 (Pa·s/m$^3$) or less. The first metal layer 21 and the second metal layer 23 may include copper. If a difference in acoustic impedance between the conductor layer and the resin layer is large, an effect of multiple reflection becomes significant, so a technical significance of this configuration is emphasized. In this case, the difference in acoustic impedance between the metal layer and the resin layer 22 becomes large, and a sound pressure becomes large when a multiple reflected wave is generated. The first metal layer 21 and the second metal layer 23 may include copper or aluminum. The first metal layer 21 and the second metal layer 23 may be formed of oxygen-free copper having a high level of conductivity. Oxygen-free copper is pure copper with a purity of 99.96% or more.

The main terminals 11 are terminals through which a main current flows among external connection terminals for electrically connecting the power module 1 and an external device. The power module 1 has a plurality of main terminals 11. The main terminals 11 are provided so as to be conductive to corresponding conductive members, respectively. The main terminal 11 and the conductive member may be configured as one component, or may be configured as separate components. If in the case of the separate components, the main terminals 11 are connected to corresponding conductive members inside the sealing resin portion 10 and protrudes to the outside from the side surface of the sealing resin portion 10. The power module 1 includes the main terminal 11 electrically connected to a drain electrode and the main terminal 11 electrically connected to a source electrode.

The signal terminals 12 are connected to signal electrodes of the corresponding semiconductor chips inside the sealing resin portion 10. The signal terminals 12 protrude from the side surface of the sealing resin portion 10 to the outside. The signal terminals 12 are electrically connected to, for example, a conductive pattern portion such as a circuit board.

An example in which the electronic device is applied to an in-vehicle power control device is described. In this case, the electronic device is used as a component of the vehicle's drive system. The vehicle drive system is described below. The vehicle drive system is mounted on a vehicle and supplies driving force for driving drive wheels of the vehicle. A drive system includes a DC power supply, a motor generator, and a power control device, and the like. The DC power supply is a power supply that supplies DC power to the power control device, and is, for example, a plurality of secondary batteries.

The motor generator includes a three-phase AC rotary electric machine, i.e., a three-phase AC motor. The motor generator functions as an electric motor for a vehicle driving power source. The motor generator functions as a generator during regeneration. The power control device performs electric power conversion between the DC power supply and the motor generator.

The power control device converts a DC voltage into a three-phase AC voltage according to switching control by a control circuit, and outputs the three-phase AC voltage to the motor generator. As a result, the vehicle travels by driving the motor generator using the AC power converted from the DC power by the power control device. The power control device converts the AC power generated by AC power generation of the motor generator into the DC power, and outputs the DC power to a high-potential-side power line in a circuit. The power control device performs electric power conversion between the DC power supply and the motor generator.

A power control device, for example, includes a booster circuit and an inverter circuit. The booster circuit has an input side connected to the DC power supply and an output side connected to the inverter circuit. The booster circuit includes a power control unit, a reactor, and a capacitor for noise reduction. The booster circuit boosts the voltage of the DC power supply in a boost mode and outputs it to the inverter circuit. The booster circuit steps down the DC voltage output from the inverter circuit in a step-down mode and supplies it to the DC power supply.

The booster circuit includes a plurality of power modules 1 to form a power control unit. The power control unit of the booster circuit controls the DC voltage of the DC power supply into a boosted voltage by turning on and off the semiconductor element included in the power module 1.

The inverter circuit includes a plurality of power modules 1 and provides a power control unit. The power control unit converts a DC power boosted by the booster circuit into an AC power by turning on and off the semiconductor elements included in the power modules 1.

The motor generator is coupled to an axle of the electric vehicle. Rotational energy of the motor generator is transmitted to drive wheels of the electric vehicle via the axle. Rotational energy of the drive wheels is transmitted to the motor generator via the axle. The motor generator generate kinetic power by an AC power supplied from the power control device. Thereby, a propulsive force is supplied to the drive wheels. The motor generator regenerates by using the rotational energy transmitted from the drive wheels. The AC power generated by this regeneration is converted into a DC power by the power control device as described above. This DC power is supplied to the DC power supply. This DC power is also supplied to various electrical loads mounted on the vehicle.

Figure 3:
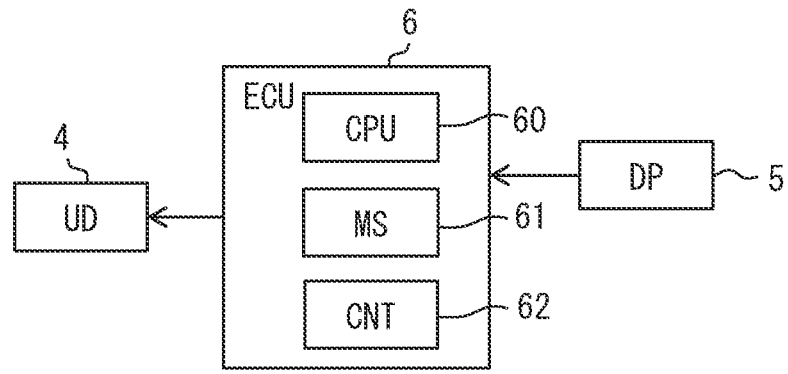
FIG. 3 is a schematic configuration diagram of an apparatus of Scanning Acoustic Tomography.

The apparatus of Scanning Acoustic Tomography can detect flaws inside the insulated circuit board 2 from images obtained by using reflection of ultrasonic waves emitted toward the insulation circuit board 2. An example of the apparatus of Scanning Acoustic Tomography is described below. As shown in FIG. 3, the apparatus of Scanning Acoustic Tomography includes an ultrasonic device (UD) 4, a display device (DP) 5, and a control device (ECU) 6.

The control device 6 has a controller circuit 62 that controls operations of the ultrasonic device 4 according to predetermined software processing. The ultrasonic device 4 vibrates a piezoelectric element in the ultrasonic probe by applying a pulse voltage, emits ultrasonic pulses in a predetermined frequency range, and detects the reflected ultrasonic pulses. The ultrasonic device 4 has a function of arbitrarily moving the position where the ultrasonic pulse is emitted to the insulated circuit board 2. The ultrasonic device 4 scans a desired portion inside an inspection object such as the insulated circuit board 2 by, for example, displacing a position of a crimping element in five axes, and acquires data for generating tomographic images. Data for generating a tomographic image are sent to the control device 6 by the ultrasound device 4.

The ultrasonic device 4 includes an oscillation circuit, a drive circuit, and a detection circuit. The oscillator circuit generates pulse signals within a predetermined frequency range. The drive circuit amplifies a voltage of the pulse signals and outputs it to the piezoelectric element. The detection circuit amplifies a detection signal from a piezoelectric element and converts the detection signal into a digital signal. The control device 6 acquires detection signals converted into digital signals.

The control device 6 stores detection signal waveforms representing temporal changes in detection signals from the ultrasonic device 4. The control device 6 can analyze the presence or absence of defects in the insulated circuit board 2 based on the detection signal waveform.

The control device 6 includes a CPU 60 and a storage device 61. The CPU can generate an internal image of the insulated circuit board 2 based on the detection signal waveform and the detection signal, and automatically analyze the presence or absence of defects. The storage device 61 stores detection signals, internal images, analysis results, and the like.

The display device 5 is composed of a display, a printing device, etc., and visually outputs analysis results analyzed by the control device 6. The display device displays the tomographic images inside the insulated circuit board 2 and the analysis results.

Figure 4:
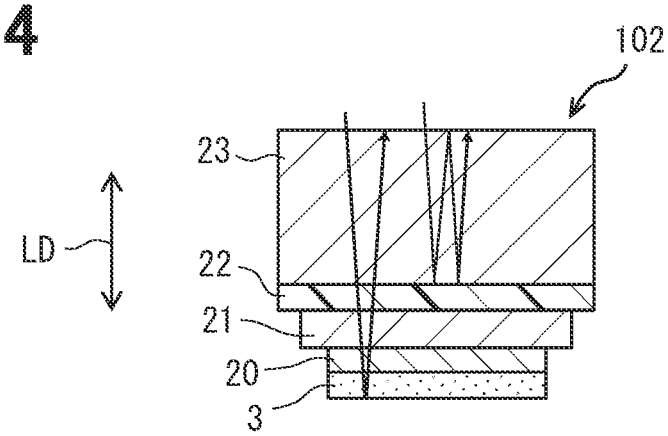
FIG. 4 is a cross-sectional view showing a first example of a one-sided structure of a laminated portion.
Figure 5:
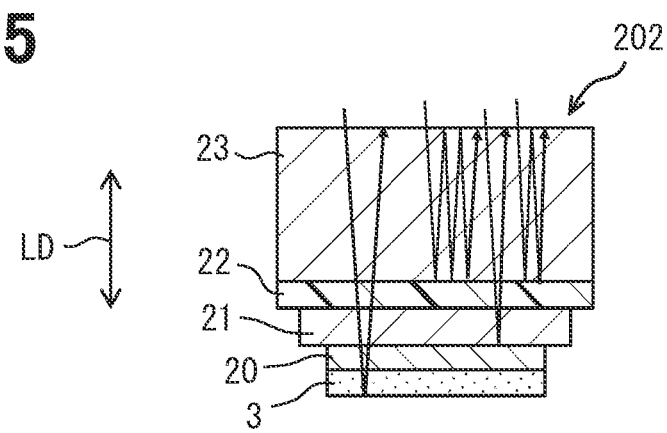
FIG. 5 is a cross-sectional view showing a second example of a one-sided structure of a laminated portion.

As shown in FIG. 4 and FIG. 5, the ultrasonic waves are reflected at each boundary surface between the bonding layer 20, the first metal layer 21, the resin layer 22, and the second metal layer 23 due to the difference in acoustic impedance of each layer. A reflected wave may reflect multiple times between two boundaries, resulting in multiple reflections. Such a reflected wave is detected as a detection signal by the ultrasonic device 4, and the control device 6 acquires the reflected wave as a peak signal of the detection signal waveform.

if the ultrasonic waves are emitted to the insulated circuit board, multiple reflections of ultrasonic waves tend to occur inside the laminated portion. Occurrence of this multiple reflected wave poses a problem of deterioration of a SAT instespectability. Therefore, in order to suppress deterioration of an instespectability due to a multiple reflected wave, the laminated portion is formed of materials and thickness dimensions that satisfy the following conditions for the detection time period of the ultrasonic pulse emitted to the laminated portion.

In order to suppress deterioration of inspectability due to a multiple reflected wave, the insulated circuit board 102 shown in FIG. 4 has a laminated portion that satisfies the following ultrasonic pulse detection times. This laminated portion is configured so that a time period in which the ultrasonic pulse travels two roundtrips in the second metal layer 23 is longer than the time it travels for the ultrasonic pulse to make one round trip in the range from the second metal layer 23 to the element 3. A time period in which the ultrasonic pulse travels two roundtrips in the second metal layer 23 is also a time period in which the ultrasonic device 4 emits a sound wave, it travels two roundtrips in the second metal layer 23 and detects it. A time period in which the ultrasonic pulse travels one roundtrip through a region from the second metal layer 23 to the element 3 is also a time period in which a sound wave is emitted from the ultrasonic device 4, travels through the region and is detected finally.

Detection time periods of the ultrasonic pulse that satisfy such relationships are explained by using time periods in which the ultrasonic pulse pass through in each layer. The thicknesses of the second conductor layer 23, the resin layer 22, the first conductor layer 21, the bonding layer 20, and the element 3 are L1 (m), L2 (m), L3 (m), L4 (m), and L5 (m), respectively. The speeds of the sound waves passing through the second conductor layer 23, the resin layer 22, the first conductor layer 21, the bonding layer 20, and the element 3 are C1 (m/s), C2 (m/s), C3 (m/s), C4 (m/s), and C5 (m/s), respectively.

A time period t0 in which the ultrasonic pulse is emitted from the ultrasonic device 4 toward the element 3 and reaches a boundary between the first conductor layer 21 and the bonding layer 20 is obtained by the mathematical equation (Math. 1). A time period t0 is the sum of a time period in which the sound wave emitted from the ultrasonic device 4 reaches the second conductor layer 23 and a time period in which the sound wave exit the second conductor layer 23 is detected by the ultrasonic device 4.

$$t_A = t_0 + \left\{ \frac{L_1}{C_1} + \frac{L_2}{C_2} + \frac{L_3}{C_3} \right\} \times 2 \quad \text{[Math. 1]}$$

A time period $t_B$ in which an ultrasonic pulse emitted from the ultrasonic device 4 toward the element 3 reaches a boundary surface between the bonding layer 20 and the element 3 located on the opposite side of the element 3 is obtained by the mathematical equation (Math. 2). A time period $t_B$ is also a time period in which the ultrasonic pulse emitted from the ultrasonic device 4 toward the element 3 pass through a range over from the second conductor layer 23 to the element 3.

$$t_B = t_0 + \left\{ \frac{L_1}{C_1} + \frac{L_2}{C_2} + \frac{L_3}{C_3} + \frac{L_4}{C_4} + \frac{L_5}{C_5} \right\} \times 2 \quad \text{[Math. 2]}$$

A time period t2 from when the ultrasonic pulse is emitted from the ultrasonic device 4 toward the element 3 and travels two roundtrips of multiple reflections through the second conductor layer 23 to when the ultrasonic pulse is detected by the ultrasonic device 4 may be obtained by the mathematical equation (Math. 3).

$$t_2 = t_0 + \left\{ \frac{L_1}{C_1} \right\} \times 4 \quad \text{[Math. 3]}$$

A time period t3 from when the ultrasonic pulse is emitted from the ultrasonic device 4 toward the element 3 and travels three roundtrips of multiple reflections through the second conductor layer 23 to when the ultrasonic pulse is detected by the ultrasonic device 4 may be obtained by the mathematical equation (Math. 4).

$$t_3 = t_0 + \left\{ \frac{L_1}{C_1} \right\} \times 6 \quad \text{[Math. 4]}$$

Since a time period in which the ultrasonic pulse travels two roundtrips in the second metal layer 23 is longer than a time period in which the ultrasonic pulse travels one roundtrip in a range from the second metal layer 23 to the element 3, $t_2 > t_B$. Therefore, this laminated portion is configured to satisfy the following mathematical equation (Math. 5) from the mathematical equations (Math. 2) and (Math. 3).

$$\frac{L_1}{C_1} - \frac{L_2}{C_2} - \frac{L_3}{C_3} - \frac{L_4}{C_4} - \frac{L_5}{C_5} > 0 \qquad [\text{Math. 5}]$$

In order to suppress deterioration of inspectability due to multiple reflected waves, the insulated circuit board 202 shown in FIG. 5 has a laminated portion that satisfies the following ultrasonic pulse detection times. The laminated portion is configured so that a time period in which the ultrasonic pulse travels three roundtrips in the second metal layer 23 is longer than a time period in which the ultrasonic pulse travels one roundtrip in a range from the second metal layer 23 to the element 3, and a time period in which the ultrasonic pulse travels one roundtrip in the second metal layer 23, the resin layer 22 and the first metal layer 21 is longer than a time period in which the ultrasonic pulse travels two roundtrips in the second metal layer 23. A time period in which the ultrasonic pulse travels three roundtrips in the second metal layer 23 is also a time period in which the ultrasonic device 4 emits a sound wave, it travels three roundtrips in the second metal layer 23 and detects it. A time period in which the ultrasonic pulse travels one roundtrip through a region from the second metal layer 23, the resin layer 22 and the first metal layer 21 is also a time period in which a sound wave is emitted from the ultrasonic device 4, travels through the region and is detected finally.

The laminated portion that satisfies such relationships has a configuration that satisfies $t_3 > t_B$ and $t_2 < t_A$. Therefore, the laminated portion is configured to satisfy the following mathematical equation (Math. 7) from the mathematical equations (Math. 2) to (Math. 4).

$$\frac{2L_1}{C_1} - \frac{L_2}{C_2} - \frac{L_3}{C_3} - \frac{L_4}{C_4} - \frac{L_5}{C_5} > 0 \qquad [\text{Math. 6}]$$

$$\frac{L_1}{C_1} - \frac{L_2}{C_2} - \frac{L_3}{C_3} < 0 \qquad [\text{Math. 7}]$$

The inventors investigated the SAT inspectability of various laminate configurations. As a first example, investigation is performed about the laminated portion 7 in which the thickness of the first metal layer 71 and the second metal layer 73 are varied and the thickness of the resin layer 72 is set to 0.15 mm, the thickness of the bonding layer 70 is set to 0.15 mm, and the thickness of the element 3 is set to 0.14 mm.

Figure 6:
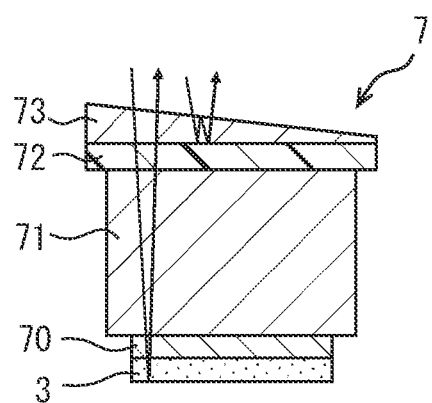
FIG. 6 is a cross-sectional view showing the laminated portion of the first example.
Figure 7:
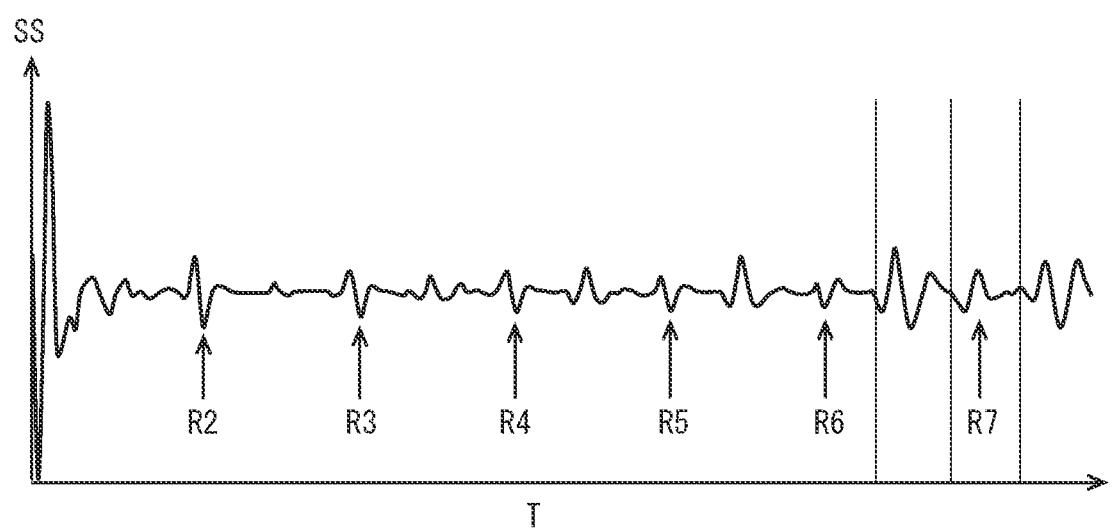
FIG. 7 is a detection signal waveform diagram obtained from the laminated portion of the first example.

As shown in FIG. 6, the laminated portion 7 of the first example is a plurality of layers in which a bonding layer 70, a first metal layer 71, a resin layer 72, and a second metal layer 73 are laminated. The first metal layer 71 and the second metal layer 73 are copper layers. The first metal layer 71 is formed so that the thickness decreases from one end toward the other end. The resin layer 72 is made of epoxy resin. FIG. 7 shows a detection signal waveform of ultrasonic waves obtained in the laminated portion 7 of the first example. In FIG. 7, the horizontal axis represents time (T), and the vertical axis represents signal strength (SS) or sound pressure.

In FIG. 7, waveforms indicated by R2 to R7 indicate peaks of multiple reflected waves. The peak indicated by R2 is a peak of a reflected waveform of two roundtrips, and the peak indicated by R3 is a peak of a reflected waveform of three roundtrips. The peak indicated by R4 is a peak of a reflected waveform of four roundtrips, and the peak indicated by R5 is a peak of a reflected waveform of five roundtrips. The peak indicated by R6 is a peak of a reflected waveform of six roundtrips, and the peak indicated by R7 is a peak of a reflected waveform of seven roundtrips.

Figure 8A:
FIG. 8A is a SAT image obtained from the laminated portion of the first example.
Figure 8B:
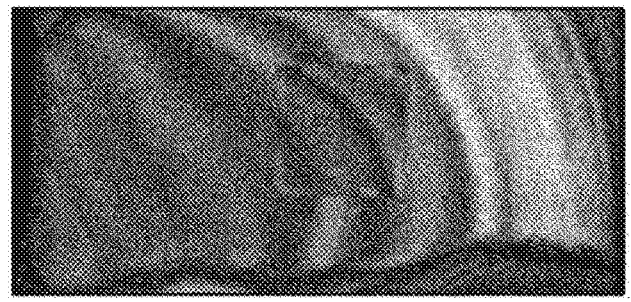
FIG. 8B is a SAT image obtained from the laminated portion of the first example.
Figure 11A:
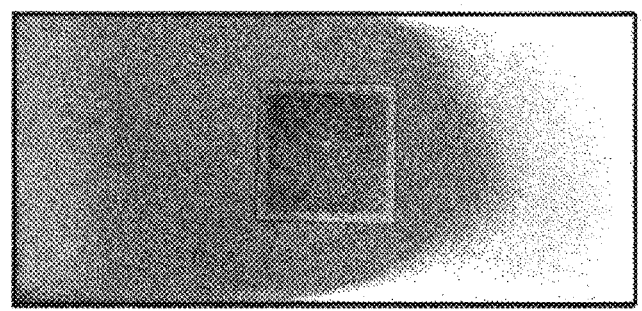
FIG. 11A is a SAT image obtained from the laminated portion of the second example.
Figure 11B:
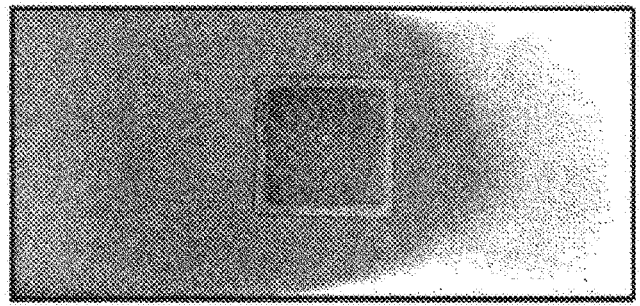
FIG. 11B is a SAT image obtained from the laminated portion of the second example.
Figure 14A:
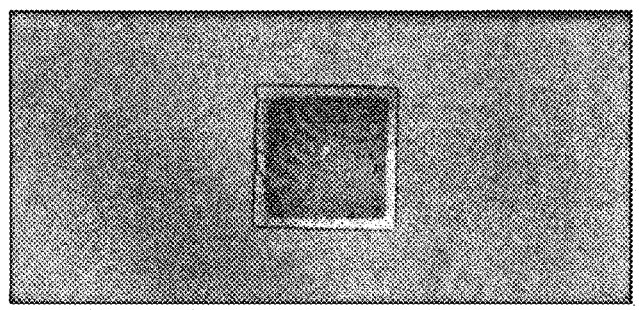
FIG. 14A is a SAT image obtained from the laminated portion of the third example.
Figure 14B:
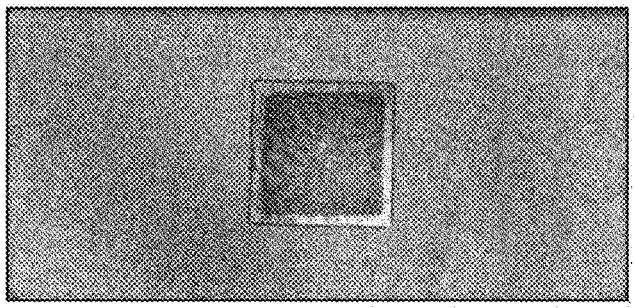
FIG. 14B is a SAT image obtained from the laminated portion of the third example.

Three vertical lines in FIG. 7 define ranges of the inspection gates. This range of the inspection gate corresponds to condition that the thickness of the first metal layer 21 is 2.0 mm and the thickness of the second metal layer 23 is 0.3 mm. FIGS. 8A and 8B are images of Scanning Acoustic Tomography (SAT image) obtained at the laminated portion 7 of the first example. FIGS. 8A and 8B show SAT images based on waveforms between vertical lines at both ends of the three vertical lines in FIG. 7. FIG. 8A, FIG. 11A and FIG. 14A show the SAT image. FIG. 8B, FIG. 11B and FIG. 14B show the images after binarization processing. In FIG. 7, a multiple reflected waveform of seven roundtrips is completely included between the vertical lines at both ends. For this reason, striped patterns are displayed in the SAT images of FIGS. 8A and 8B to deteriorate a SAT inspectability and it is confirmed that the inspectability is NG.

As a second example, investigation is performed about the laminated portion 8 in which the thickness of the first metal layer 81 and the second metal layer 83 are varied and the thickness of the resin layer 82 is set to 0.15 mm, the thickness of the bonding layer 80 is set to 0.15 mm, and the thickness of the element 3 is set to 0.14 mm.

Figure 9:
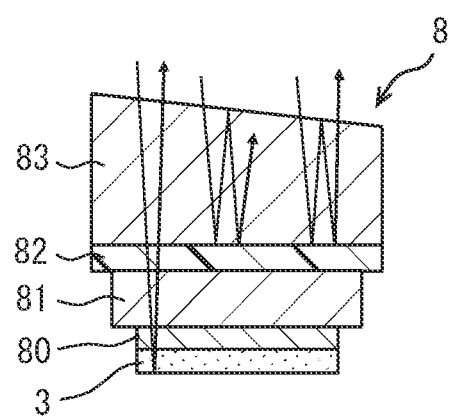
FIG. 9 is a cross-sectional view showing the laminated portion of the second example.
Figure 10:
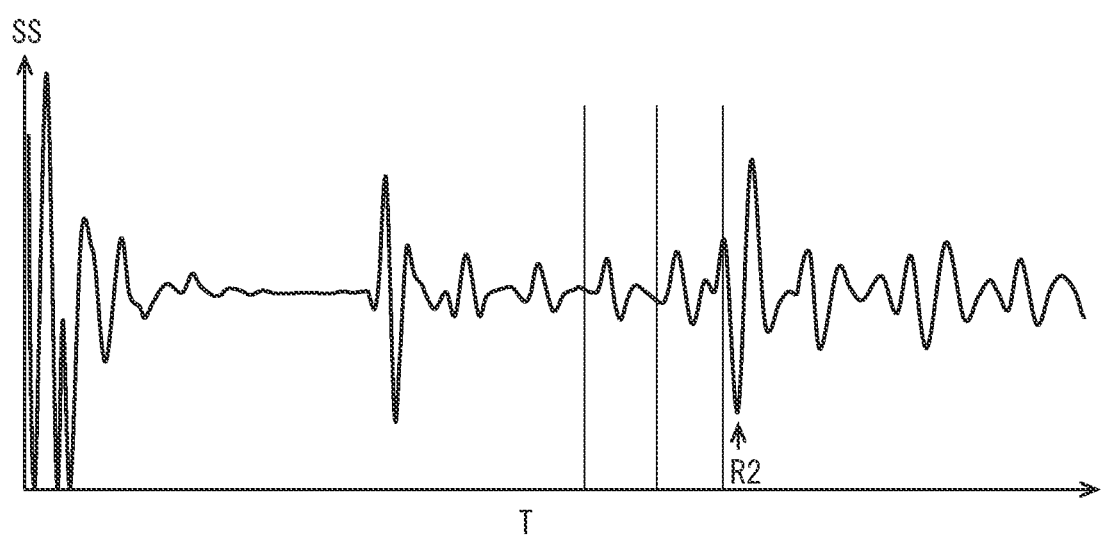
FIG. 10 is a detection signal waveform diagram obtained from the laminated portion of the second example.

As shown in FIG. 9, the laminated portion 8 of the second example is a plurality of layers in which a bonding layer 80, a first metal layer 81, a resin layer 82, and a second metal layer 83 are laminated. The first metal layer 81 and the second metal layer 83 are copper layers. The first metal layer 81 is formed so that the thickness decreases from one end toward the other end. The resin layer 82 is made of epoxy resin. FIG. 10 shows a detection signal waveform of ultrasonic waves obtained in the laminated portion 8 of the second example. In FIG. 10, the horizontal axis represents time (T), and the vertical axis represents signal strength (SS) or sound pressure.

In FIG. 10, a waveform indicated by R2 indicates a peak of a reflected waveform of two roundtrips. Three vertical lines in FIG. 10 define ranges of the inspection gates. This range of the inspection gate corresponds to condition that the thickness of the first metal layer 21 is 0.5 mm and the thickness of the second metal layer 23 is 1.0 mm. FIGS. 11A and 11B are images of Scanning Acoustic Tomography (SAT image) obtained at the laminated portion 8 of the second example. FIGS. 11A and 11B show SAT images based on waveforms between vertical lines at both ends of the three vertical lines in FIG. 10. In FIG. 10, a multiple reflected waveform of two roundtrips is approximate between the vertical lines at both ends. For this reason, white portions are displayed in the SAT images of FIGS. 11A and 11B to deteriorate a SAT inspectability and it is confirmed that the inspectability is NG.

As a third example, investigation is performed about the laminated portion 9 in which the thickness of the first metal layer 71 and the second metal layer 73 are varied and the thickness of the resin layer 72 is set to 0.15 mm, the thickness of the bonding layer 70 is set to 0.15 mm, and the thickness of the element 3 is set to 0.14 mm.

Figure 12:
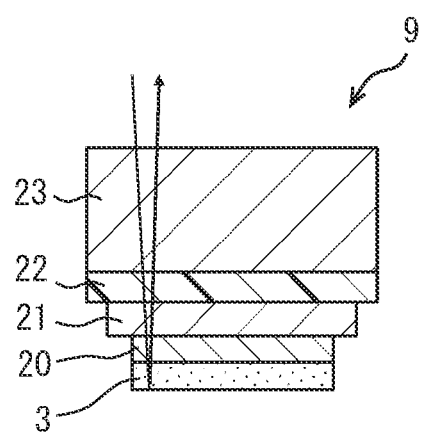
FIG. 12 is a cross-sectional view showing the laminated portion of the third example.
Figure 13:
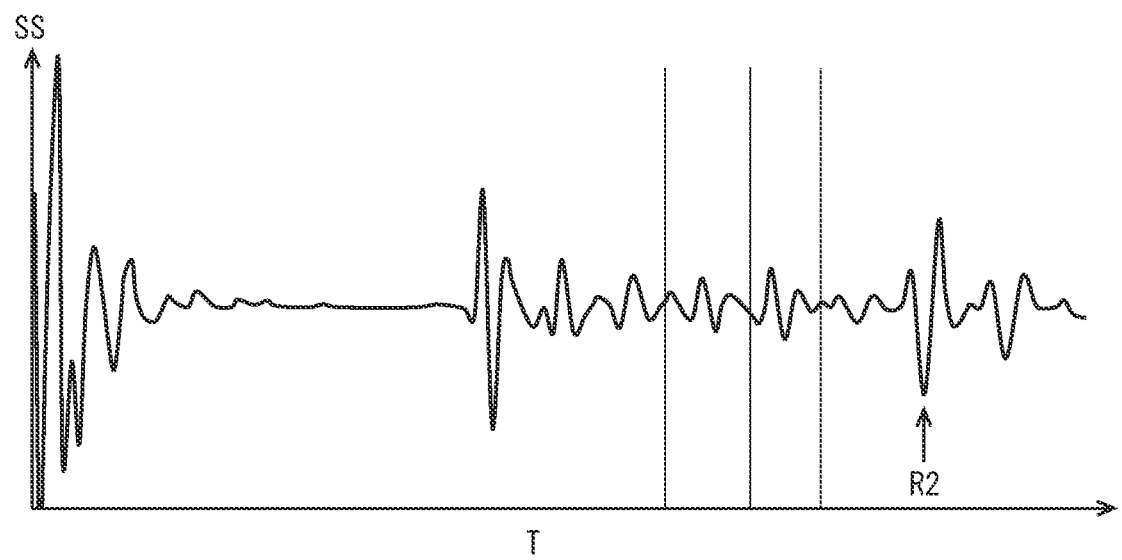
FIG. 13 is a detection signal waveform diagram obtained from the laminated portion of the third example.

As shown in FIG. 12, the laminated portion 9 of the third example is a plurality of layers in which the bonding layer 20, the first metal layer 21, the resin layer 22, and the second metal layer 23 are laminated. The first metal layer 21 and the second metal layer 23 are copper layers. The resin layer 22 is made of epoxy resin. FIG. 13 shows a detection signal waveform of ultrasonic waves obtained in the laminated portion 9 of the third example. In FIG. 13, the horizontal axis represents time (T), and the vertical axis represents signal strength (SS) or sound pressure.

In FIG. 13, a waveform indicated by R2 indicates a peak of a reflected waveform of two roundtrips. Three vertical lines in FIG. 13 define ranges of the inspection gates. The range of this inspection gate correspond to condition of, if the thickness of the metal layer on the heat dissipation surface side is sufficiently large, for example, the thickness of the first metal layer 21 is 0.5 mm, and the thickness of the second metal layer 23 is 2.5 mm. FIGS. 14A and 14B are images of Scanning Acoustic Tomography (SAT image) obtained at the laminated portion 9 of the third example. FIGS. 14A and 14B show SAT images based on waveforms between vertical lines at both ends of the three vertical lines in FIG. 13. In FIG. 13, a multiple reflected waveform of two roundtrips is far apart from between the vertical lines at both ends. As described above, since an influence of a multiple reflected wave on the inspection gate is small, it is confirmed that the SAT inspectability is OK and flaw detection is possible.

FIGS. 15 to 22 show the results of confirming the NG distribution and OK distribution of SAT inspectabilities for various configurations by changing the thickness of each layer and the material of each layer in the laminated portion. In each drawings, the horizontal axis is the thickness (mm) of the first metal layer, and the vertical axis is the thickness (mm) of the second metal layer. The resin layer in FIGS. 15 to 21 is formed of epoxy resin.

Figure 15:
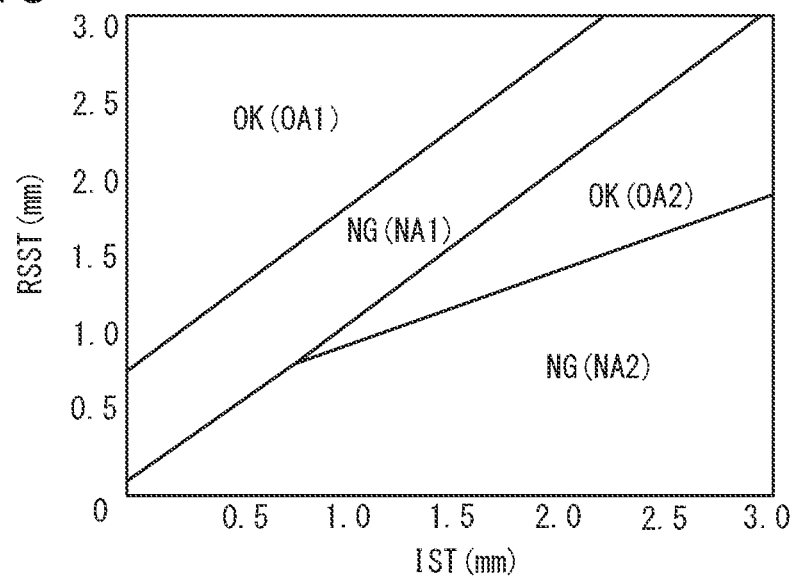
FIG. 15 is a distribution diagram showing OK areas and NG areas of inspectabilities for a structure with a resin layer thickness of 0.15 mm.

FIG. 15 is a distribution diagram showing OK areas and NG areas of an inspectability for a multilayer structure with a resin layer thickness of 0.15 mm, a bonding layer thickness of 0.15 mm, and an element thickness of 0.14 mm. In FIG. 15, the OK areas of the inspectability are areas included in OA1 and OA2. The OK areas of the inspectability in FIG. 15 are included in the laminated portion satisfying a technical idea (1) or a technical idea (2) described later. In FIG. 15, the NG areas are areas included in NA1 and NA2.

Figure 16:
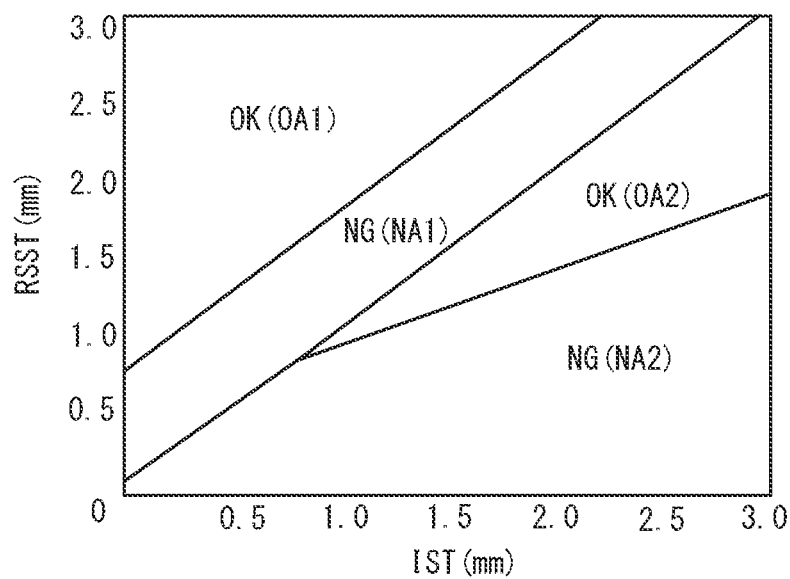
FIG. 16 is a distribution diagram showing OK areas and NG areas of inspectabilities for a structure with a resin layer thickness of 0.10 mm.

FIG. 16 is a distribution diagram showing OK areas and NG areas of an inspectability for a multilayer structure with a resin layer thickness of 0.10 mm, a bonding layer thickness of 0.15 mm, and an element thickness of 0.14 mm. In FIG. 16, the OK areas of the inspectability are areas included in OA1 and OA2. The OK areas of the inspectability in FIG. 16 are included in the laminated portion satisfying a technical idea (1) or a technical idea (2) described later. In FIG. 16, the NG areas are areas included in NA1 and NA2.

Figure 17:
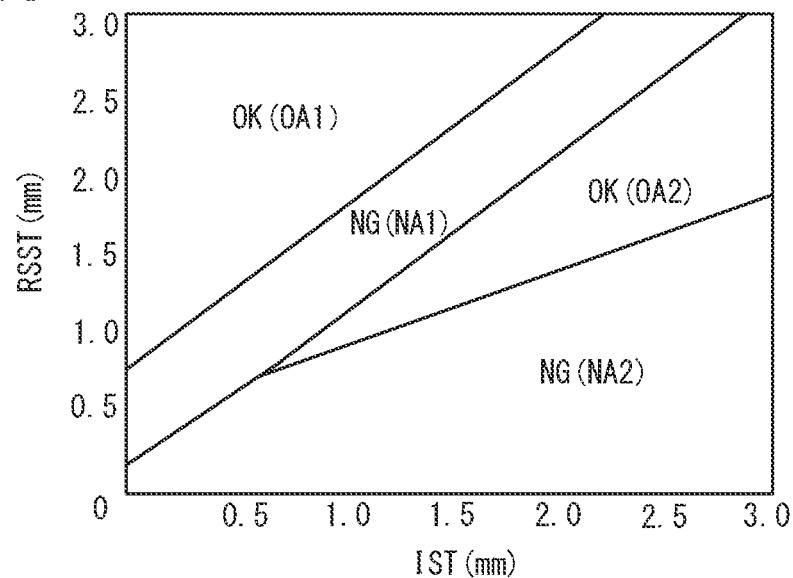
FIG. 17 is a distribution diagram showing OK areas and NG areas of inspectabilities for a structure with a resin layer thickness of 0.20 mm.

FIG. 17 is a distribution diagram showing OK areas and NG areas of an inspectability for a multilayer structure with a resin layer thickness of 0.20 mm, a bonding layer thickness of 0.15 mm, and an element thickness of 0.14 mm. In FIG. 17, the OK areas of the inspectability are areas included in OA1 and OA2. The OK areas of the inspectability in FIG. 17 are included in the laminated portion satisfying a technical idea (1) or a technical idea (2) described later. In FIG. 17, the NG areas are areas included in NA1 and NA2. The area NA1 in FIG. 17 is an area moved to the upper left side of the distribution diagram with respect to the area NA1 in FIGS. 15 and 16.

Figure 18:
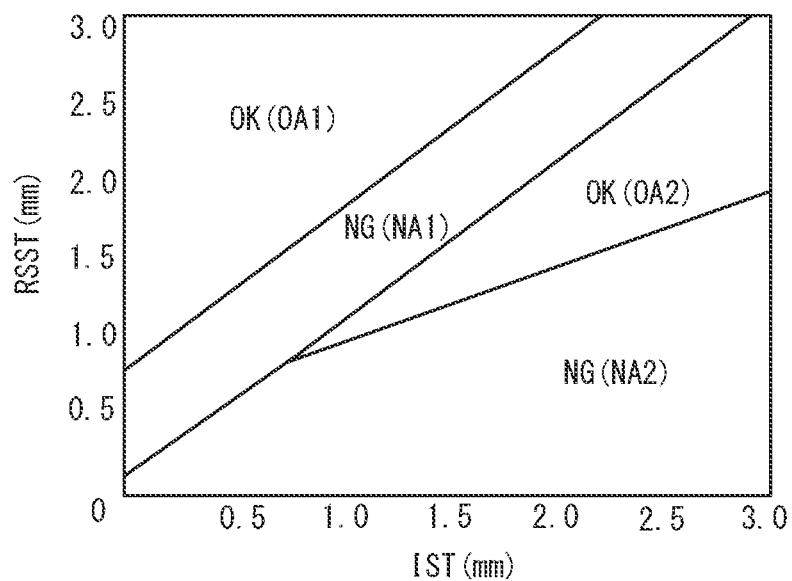
FIG. 18 is a distribution diagram showing OK areas and NG areas of inspectabilities for a structure with a bonding layer thickness of 0.10 mm on one side and a bonding layer thickness of 0.15 mm on the other side.

FIG. 18 is a distribution diagram showing OK areas and NG areas of an inspectability for a multilayer structure with a resin layer thickness of 0.15 mm, a bonding layer thickness of 0.10 mm, a bonding layer thickness of 0.15 mm on the other side and an element thickness of 0.14 mm. In FIG. 18, the OK areas of the inspectability are areas included in OA1 and OA2. The OK areas of the inspectability in FIG. 18 are included in the laminated portion satisfying a technical idea (1) or a technical idea (2) described later. In FIG. 18, the NG areas of the inspectability are areas included in NA1 and NA2.

Figure 19:
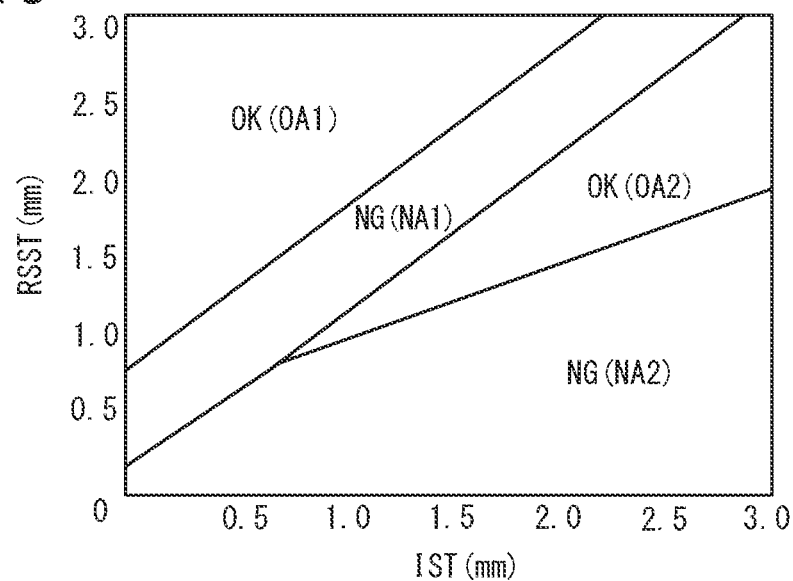
FIG. 19 is a distribution diagram showing OK areas and NG areas of inspectabilities for a structure with a bonding layer thickness of 0.30 mm on one side and a bonding layer thickness of 0.15 mm on the other side.

FIG. 19 is a distribution diagram showing OK areas and NG areas of an inspectability for a multilayer structure with a resin layer thickness of 0.15 mm, a bonding layer thickness of 0.30 mm on one side, a bonding layer thickness of 0.15 mm on the other side and an element thickness of 0.14 mm. In FIG. 19, the OK areas of the inspectability are areas included in OA1 and OA2. The OK areas of the inspectability in FIG. 19 are included in the laminated portion satisfying a technical idea (1) or a technical idea (2) described later. In FIG. 19, the NG areas of the inspectability are areas included in NA1 and NA2. The area NA1 in FIG. 19 is an area slightly expanded toward the upper left side of the distribution map with respect to the area NA1 in FIGS. 15 and 16.

Figure 20:
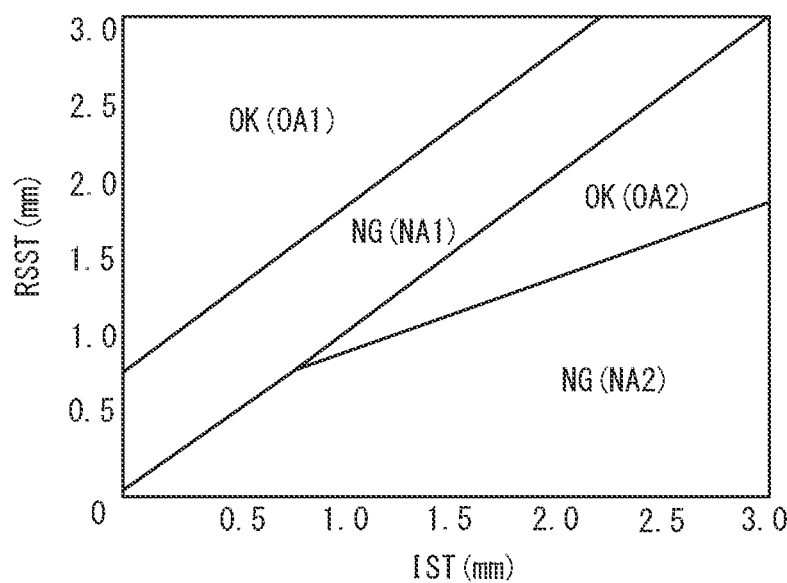
FIG. 20 is a distribution diagram showing OK areas and NG areas of inspectabilities for a structure with a bonding layer thickness of 0.15 mm on one side and a bonding layer thickness of 0.10 mm on the other side.

FIG. 20 is a distribution diagram showing OK areas and NG areas of an inspectability for a multilayer structure with a resin layer thickness of 0.15 mm, a bonding layer thickness of 0.15 mm on one side, a bonding layer thickness of 0.10 mm on the other side and an element thickness of 0.14 mm. In FIG. 20, the OK areas of the inspectability are areas included in OA1 and OA2. The OK areas of the inspectability in FIG. 20 are included in the laminated portion satisfying a technical idea (1) or a technical idea (2) described later. In FIG. 20, the NG areas of the inspectability are areas included in NA1 and NA2.

Figure 21:
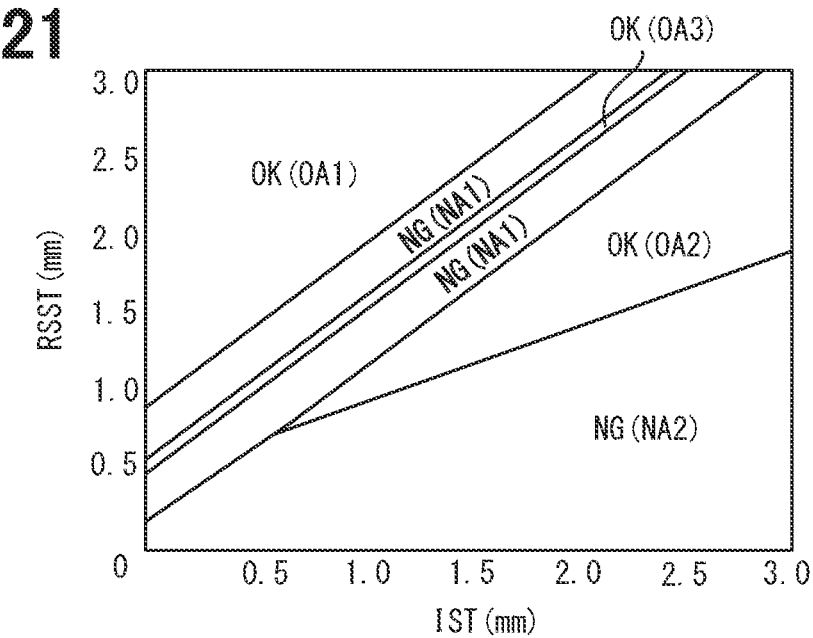
FIG. 21 is a distribution diagram showing OK areas and NG areas of inspectabilities for a structure with a bonding layer thickness of 0.15 mm on one side and a bonding layer thickness of 0.30 mm on the other side.

FIG. 21 is a distribution diagram showing OK areas and NG areas of an inspectability for a multilayer structure with a resin layer thickness of 0.15 mm, a bonding layer thickness of 0.15 mm on one side, a bonding layer thickness of 0.30 mm on the other side and an element thickness of 0.14 mm. In FIG. 21, the OK areas of the inspectability are areas included in OA1, OA2 and OA3. The OK areas of the inspectability in FIG. 21 are included in the laminated portion satisfying a technical idea (1) or a technical idea (2) described later. In FIG. 21, the NG areas of the inspectability are areas included in NA1 and NA2. The area of OA3 in FIG. 21 is distributed so as to be sandwiched between the areas of NA1 on both sides.

Figure 22:
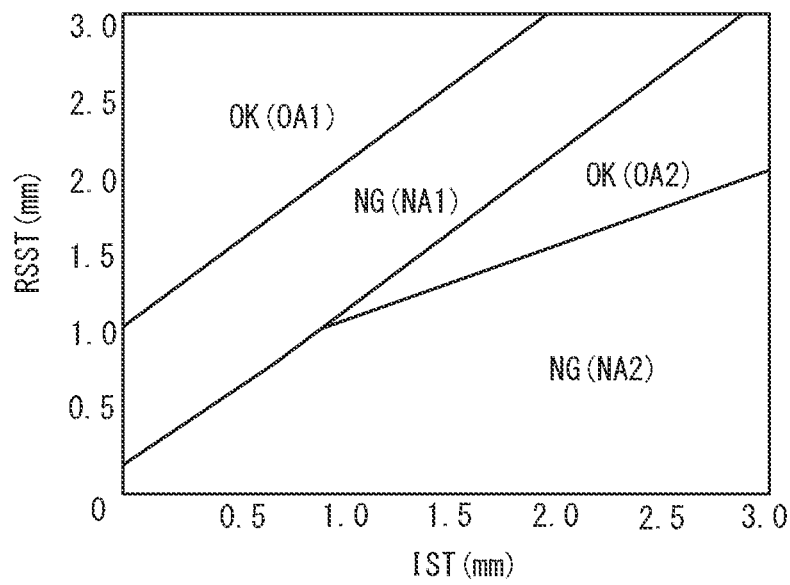
FIG. 22 is a distribution diagram showing OK areas and NG areas of inspectabilities for a structure including a conductor layer made of aluminum and a resin layer made of epoxy resin.

FIG. 22 is a distribution diagram showing OK areas and NG areas of the inspectability in the laminated structure, which is an epoxy-based resin layer and a metal layer formed of aluminum. In FIG. 22, the OK areas of the inspectability are areas included in OA1 and OA2. The OK areas of the inspectability in FIG. 22 are included in the laminated portion satisfying a technical idea (1) or a technical idea (2) described later. In FIG. 22, the NG areas of the inspectability are areas included in NA1 and NA2. The area NA1 in FIG. 22 is an area slightly expanded toward the upper left side of the distribution map with respect to the area NA1 in FIGS. 15 and 16.

Figure 23:
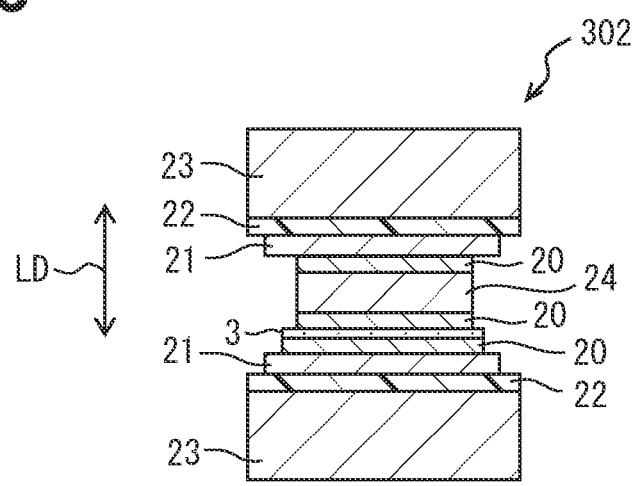
FIG. 23 is a cross-sectional view showing another insulated circuit board.

FIG. 23 illustrates an alternative form of an insulated circuit board 302 that can accomplish the purposes disclosed herein. The insulated circuit board 302 provides a laminated portion including a plurality of layers. The insulated circuit board 302 includes a pair of laminated portions provided on both sides of the element 3 so as to sandwich the element 3 therebetween. One laminated portion is formed by laminating the bonding layer 20, the first metal layer 21, the resin layer 22, and the second metal layer 23 in an order close to the element 3. The other laminated portion is formed by laminating the bonding layer 20, the spacer 24, the bonding layer 20, the first metal layer 21, the resin layer 22, and the second metal layer 23 in an order close to the element 3. The insulated circuit board 302 enables double-sided heat dissipation in which the heat generated by the element 3 is radiated from the pair of second metal layers 23 located outside of both surfaces of the element 3.

Functions and advantages produced by the power control apparatus 1 according to the first embodiment are described.

Technical Idea (1)

An electronic device comprises an element 3 and a laminated portion. The laminated portion includes a first conductor layer, a bonding layer that is interposed between the element 3 and the first conductor layer and conducts electricity, a second conductor layer, and a resin layer 22 interposed between the first conductor layer and the second conductor layer. The laminated portion is configured so that an ultrasonic pulse emitted from an outside of the second metal layer toward the element have the following relationship of detection time periods. A time period in which the ultrasonic pulse travels two roundtrips in the second conductor layer is longer than a time period in which the ultrasonic pulse travels one roundtrip in a range from the second conductor layer to the element 3.

According to this apparatus, the time period in which the ultrasonic pulse travels two roundtrips in the second conductor layer is longer than the time period in which the ultrasonic pulse travels one roundtrip in the range from the second conductor layer to the element 3. Since the laminated portion has such a configuration, it is possible to suppress multiple reflected waves from entering the inspection gate in the image of Scanning Acoustic Tomography of the laminated portion as described above, and improve inspectability of an image of SAT.

Technical Idea (2)

The laminated portion is configured so that an ultrasonic pulse emitted from an outside of the second metal layer toward the element have the following relationship of detection time periods. A time period in which the ultrasonic pulse travels three roundtrips in the second conductor layer is longer than a time period in which the ultrasonic pulse travels one roundtrip in a range from the second conductor layer to the element 3. Furthermore, the time period in which the ultrasonic pulse travels one roundtrip in the second conductor layer, the resin layer 22 and the first conductor layer is longer than the time period in which the ultrasonic pulse travels two roundtrips in the second conductor layer.

This electronic device includes a laminated portion that satisfies the ultrasonic pulse detection conditions as in technical idea (1) or (2). Since the laminated portion is configured as described above, it is possible to suppress multiple reflected waves from entering the inspection gate in the image of Scanning Acoustic Tomography of the laminated portion as described above, and improve inspectability of an image of SAT.

The electronic device includes a pair of laminated portions provided on both sides of the element 3 so as to sandwich the element 3 therebetween. According to this, it is possible to provide an electronic device including a laminated portion that can obtain good SAT inspectability through the resin layer on both surface sides of the element 3.

The laminated portion is configured such that the resin layer 22 includes an organic substance and an inorganic substance. According to this, it is possible to provide a laminated portion having good SAT inspectability and rigidity by forming the resin layer 22 from a composite with an inorganic substance such as glass or filler, for example.

The laminated portion is configured so that an acoustic impedance of the resin layer 22 is 10 (Pa·s/m$^3$) or less, and the first conductor layer and the second conductor layer contain copper. This increases a difference in acoustic impedance between the resin layer 22 and the first and second conductor layers. Since a sound pressure of the multiple reflected wave increases as a difference in acoustic impedance increases, a technical significance of the electronic device including the laminated portion having the configuration described above is great.

The laminated portion is configured such that the first conductor layer and the second conductor layer contain aluminum. According to this, it is possible to provide good SAT inspectability through the resin layer for the laminated portion including the conductor layer formed containing aluminum and the resin layer 22.

Preferably, the electronic device is a power module comprising a switching element forming an element and a laminated portion described in this embodiment. According to this, as described above, it is possible to obtain a power module capable of suppressing a multiple reflected wave from entering the inspection gate in the image of Scanning Acoustic Tomography of the laminated portion and improving inspectability of an image of SAT.

Other Embodiments

The disclosure of this specification is not limited to the illustrated embodiment. The disclosure encompasses the illustrated embodiments and variations based on the embodiments by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure includes the embodiments from which the parts and the components are omitted. The disclosure encompasses the replacement or combination of components, elements between one embodiment and another. The disclosed technical scope is not limited to the description of the embodiments. It should be understood that some disclosed technical ranges are indicated by description of claims, and includes every modification within the equivalent meaning and the scope of description of claims.

What is claimed is:

1. An electronic device, comprising:
   an element;
   a laminated portion which is formed to include a first conductor layer formed to include a conductor, a bonding layer interposed between the element and the first conductor layer to conduct electricity, and a second conductor layer formed to include a conductor, and a resin layer formed to include a resin and interposed between the first conductor layer and the second conductor layer; and
   a pair of the laminated portions provided on both sides of the element so as to sandwich the element, wherein the laminated portion is configured so that a time period in which an ultrasonic pulse emitted from outside the second conductor layer toward the element travels two roundtrips in the second conductor layer is longer than a time period in which the ultrasonic pulse travels one roundtrip through a range from the second conductor layer to the element.

2. The electronic device, according to claim 1, wherein the laminated portion is configured so that the resin layer contains an organic substance and an inorganic substance.

3. The electronic device, according to claim 1, wherein the laminated portion is configured so that an acoustic impedance of the resin layer is 10 (Pa·s/m3) or less, and the first conductor layer and the second conductor layer are formed containing copper.

4. The electronic device, according to claim 1, wherein the laminated portion is configured so that the first conductor layer and the second conductor layer contain aluminum.

5. A power module, comprising:
a switching element providing the element; and
the laminated portion according to claim 1.

6. An electronic device, comprising:
an element;
a laminated portion which is formed to include a first conductor layer formed to include a conductor, a bonding layer interposed between the element and the first conductor layer to conduct electricity, and a second conductor layer formed to include a conductor, and a resin layer formed to include a resin and interposed between the first conductor layer and the second conductor layer; and
a pair of the laminated portions provided on both sides of the element so as to sandwich the element, wherein
the laminated portion is configured so that:
a time period in which an ultrasonic pulse emitted from outside the second conductor layer toward the element travels three roundtrips in the second conductor layer is longer than a time period in which the ultrasonic pulse travels one roundtrip in a range from the second conductor layer to the element; and
a time period in which the ultrasonic pulse travels one roundtrip in the second conductor layer, the resin layer, and the first conductor layer is longer than a time period in which the ultrasonic pulse travels two roundtrips in the second conductor layer.

7. The electronic device, according to claim 6, wherein the laminated portion is configured so that the resin layer contains an organic substance and an inorganic substance.

8. The electronic device, according to claim 6, wherein the laminated portion is configured so that an acoustic impedance of the resin layer is 10 (Pa·s/m3) or less, and the first conductor layer and the second conductor layer are formed containing copper.

9. The electronic device, according to claim 6, wherein the laminated portion is configured so that the first conductor layer and the second conductor layer contain aluminum.

10. A power module, comprising:
a switching element providing the element; and
the laminated portion according to claim 6.

* * * * *